UNITED STATES PATENT OFFICE.

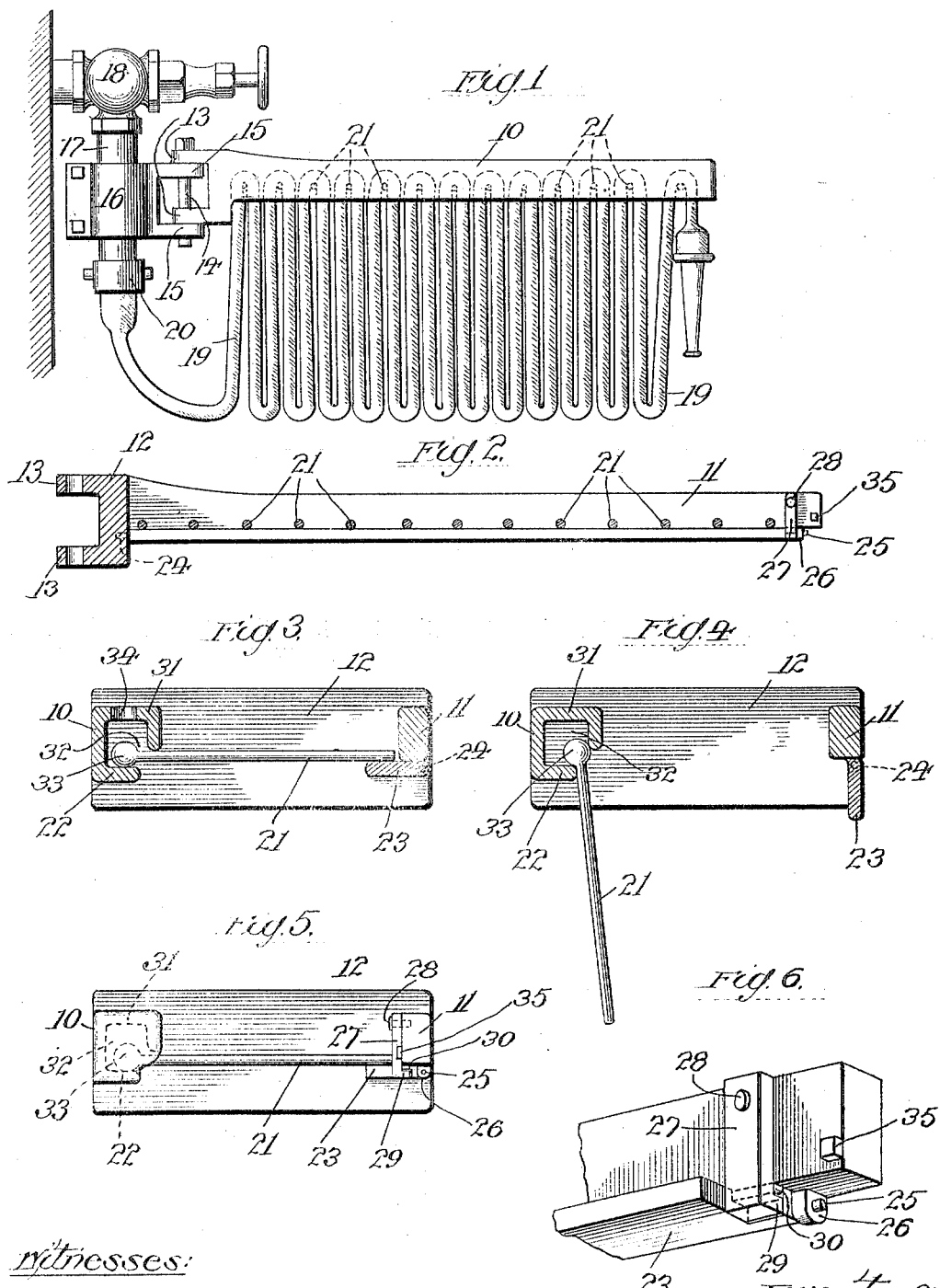

WILLIAM D. ALLEN AND CHARLES FRANKLIN BOWES, OF CHICAGO, ILLINOIS, ASSIGNORS TO W. D. ALLEN MANUFACTURING COMPANY, OF CHICAGO, ILLINOIS, A CORPORATION.

HOSE-RACK.

No. 811,686.      Specification of Letters Patent.      Patented Feb. 6, 1906.

Application filed February 8, 1905. Serial No. 244,749.

*To all whom it may concern:*

Be it known that we, WILLIAM D. ALLEN and CHARLES FRANKLIN BOWES, citizens of the United States, and residents of Chicago, county of Cook, and State of Illinois, have invented certain new and useful Improvements in Hose-Racks, of which the following is declared to be a full, clear, and exact description.

The invention relates to racks or holders for supporting hose intended for fire-protective purposes. In particular the invention relates to that type of rack in which the hose is supported in a series of depending loops from cross supports or pins.

The object of the invention is to provide a simple and effective construction by which the cross supports or pins may be released to quickly drop the hose from the rack when the latter is desired for use.

A further object of the invention is to provide a hose-rack in which the hose-carrying supports or pins are pivotally connected to the rack at one end, so that they will not drop therefrom when the hose is removed, together with means for releasably supporting the free ends of the pins, so that the hose may be quickly removed from the rack.

With these and other objects in view the invention consists in the features of construction, combinations, and arrangements of parts hereinafter set forth, illustrated in the accompanying drawings, and more particularly pointed out in the appended claims.

In the drawings, Figure 1 is a side elevation of the improved hose-rack with the hose shown in position thereon. Fig. 2 is a longitudinal section of the improved rack. Figs. 3 and 4 are cross-sections thereof. Fig. 5 is an end view of the rack, and Fig. 6 is a detail perspective view of a portion of the outer end of the rack.

The main body of the improved hose-rack comprises a pair of side supporting-arms 10 and 11, which are connected together at their inner ends by a cross-piece or bracket 12. If desired, the side arms 10 and 11 and bracket 12 may be cast in one piece. The hose-rack is preferably arranged to swing in a horizontal plane, and for this purpose the end piece 12 is provided with perforated lugs 13. A bolt 14, extending through the lugs 13 and through a corresponding pair of perforated lugs 15 on a support 16, pivotally connects the rack to the support. The support 16 in the construction shown is in the form of a clamp-ring adapted to engage and carry the rack upon the supply-pipe 17. Supply-pipe 17 is provided with the usual controlling-valve 18, and the hose 19 is connected to the supply-pipe by a coupling 20.

If desired, the support 16 may be in the form of a flat plate for mounting the hose-rack on the wall.

The cross supports or pins 21 extend between the side supporting-arms 10 and 11 and are arranged to carry the hose 19 in a series of depending loops, as indicated in Fig. 1. Suitable means are provided for supporting the cross-pins 21 upon the rack, such supporting means being shiftable to release the pins and drop the hose carried thereby. Such means preferably comprises supporting-ledges 22 and 23, upon which the ends of the pins normally rest. The horizontal supporting-ledge 22 is fixed to or formed in piece with the arm 10, while the supporting-ledge 23 is shiftably mounted upon the arm 11, so as to releasably sustain the pins. The supporting-ledge 23 is preferably pivoted beneath the arm 11 to swing downwardly therefrom, and for this purpose ledge 23 is provided at its ends and near its outer edge with pins 24 and 25. Pin 24 at the inner end of the supporting-ledge 23 is fitted within a socket in the end piece 12, as indicated in dotted lines in Fig. 2. The pivot-pin 25 at the outer end of the ledge engages a perforated ear or lug 26 on the under side of the arm 11, as shown in Figs. 5 and 6.

Suitable means adapted to be released in the act of removing the hose from the rack is provided for normally upholding the supporting-ledge 23 in horizontal position. Such means preferably comprises a latch 27, connected by a pivot-pin or bolt 28 to the inner face of the side arm 11, near the outer end thereof. (See Figs. 2, 5, and 6.) The offset lug 29 on the lower end of the latch 27 is arranged to engage a lug 30 on the end of the supporting-ledge 23 and hold the same in horizontal position, so as to support the cross-pins 21.

It should be noted that the cross supports or pins 21 are free to slide on the supporting-ledges 22 and 23 of the side arms, and this arrangement will be found convenient in placing the hose upon the rack.

The cross supports or pins 21 are preferably connected to the arm 10, so that they will not drop from the rack when the hose is removed therefrom. For this purpose the arm 10 is provided with an overhanging portion 31, so arranged that a guideway or slot 32 is formed between the overhanging portion 31 and the ledge 22. The pins are provided at their ends with heads 33, which loosely fit within the guideway or slot of the arm 10, which heads are larger than the opening from the guideway 32, so that the pins are permanently connected to the side arm 10. The heads 33 are preferably spherical or ball-shaped, as indicated, and the pins are placed in position upon the arm 10 by inserting them small end first through an opening 34 (see Fig. 3) in the upper side of the arm 10. The outer end of the slot or guideway 32 in the arm 10 is preferably closed, as indicated in Fig. 5, so that the pins cannot be displaced therefrom by longitudinal movement.

The loose joint between the pins and the arm 10 is such that the pins are, in effect, pivotally connected thereto and are free to swing downwardly therefrom, as indicated in Fig. 4, when the supporting-ledge 23 is shifted to release the free ends of the pins.

As stated, the latch 27 normally engages the lug 30 on supporting-ledge 23 to hold the ledge up in horizontal position, as indicated in Figs. 3 and 6. In this position the cross supports or pins 21 will rest in horizontal position upon the ledges 22 and 23 and carry the hose in a series of depending loops, as indicated in Fig. 1.

When the hose is desired for use, a pull upon its outer end will shift the outermost pin 21 against the latch 27, so that the latter is shifted to release the supporting-ledge 23. The supporting-ledge then drops into the position indicated in Fig. 4, and the pins 21 are simultaneously released and swing downwardly, so that the hose is released from the rack. A stop-lug 35 on the end of the arm 11 limits the outward movement of the latch 27.

It is obvious that numerous changes may be made in the details of structure without departure from the essentials of the invention.

Having described our invention, what we claim as new, and desire to secure by Letters Patent, is—

1. In a hose-rack, the combination of a series of hose-carrying cross-supports, side supports between which said cross-supports extend, one of said side supports being shiftable to release the cross-supports and drop the hose from the rack and a releasable latch for holding said shiftable side support in normal position, substantially as described.

2. The combination with a hose-rack, of a series of hose-carrying cross-supports and a supporting device common to all of said cross-supports and shiftable to simultaneously release the same to drop the hose bodily from the rack, substantially as described.

3. In a hose-rack, the combination of a series of hose-carrying cross-supports, side supports between which said cross-supports extend, one of said side supports being pivoted to swing downwardly and release the cross-supports and releasable means for normally upholding said pivoted side support, substantially as described.

4. In a hose-rack, the combination of a series of hose-carrying cross-supports, side supports between which said cross-supports extend, one of said side supports being pivoted to swing downwardly and a latch at the outer end of the rack for normally upholding said swinging side support, said latch being releasable in the act of removing the hose from the rack, substantially as described.

5. In a hose-rack, the combination of a pair of side arms, of a series of hose-carrying cross-supports extending between said side arms and releasable means on one of said side arms for sustaining the pins in position, substantially as described.

6. In a hose-rack, the combination of a pair of side arms, a series of hose-carrying cross-pins extending between said arms and a shiftable support common to all of said pins on one of said side arms for releasably sustaining the same in position, substantially as described.

7. In a hose-rack, the combination of a pair of side arms, a series of hose-carrying cross-pins extending between said arms, a swinging supporting-ledge on one of said side arms for releasably sustaining the pins and a latch for normally upholding said ledge, substantially as described.

8. In a hose-rack, the combination with a pair of side arms, of a series of hose-carrying cross-pins pivotally connected at one end to one of said arms to swing downwardly therefrom, and shiftable supporting means on the other of said arms for releasably sustaining the free ends of said pins, substantially as described.

9. In a hose-rack, the combination with a pair of side arms, of a series of hose-carrying cross-pins pivotally connected at one end to one of said arms to swing downwardly therefrom, a supporting-ledge pivotally mounted on the other of said arms for releasably sustaining the free ends of said pins and a latch for upholding said supporting-ledge, substantially as described.

10. In a hose-rack, the combination with a pair of side arms, of a series of hose-carrying cross-pins pivotally and slidably connected at one end to one of said arms, and a support on the other of said arms with which the free ends of said pins slidably engage, said support being shiftable to release the ends of the pins and drop the hose from the rack, substantially as described.

11. In a hose-rack, the combination of a pair of side arms, one of said arms having a slot or guideway, a series of hose-carrying cross-supports having heads at one end loosely engaging said guideway to connect said pins to said arm and shiftable supporting means on the other of said arms for releasably sustaining the free ends of said cross-supports, substantially as described.

12. In a hose-rack, the combination of a pair of side arms, one of said arms having a slot or guideway, a series of hose-carrying cross-pins having heads at one end loosely engaging said slot to pivotally and slidably connect said pins to said arm, a swinging support on the other of said arms for upholding the free ends of the pins and a releasable latch for upholding said support, substantially as described.

13. In a hose-rack, the combination of a pair of side arms, one of said arms having a slot or guideway, a series of hose-carrying cross-pins having ball-heads at one end loosely engaging said slot or guideway, a supporting-ledge pivoted to the other of said arms to swing downwardly therefrom, and a latch arranged to be released in the act of removing the hose from the rack for normally holding said ledge in position to sustain the free ends of the pins, substantially as described.

WILLIAM D. ALLEN.
CHARLES FRANKLIN BOWES.

Witnesses:
KATHARINE GERLACH,
LILLIAN PRENTICE.